United States Patent

[11] 3,584,834

| [72] | Inventors | Otto S. Reid;<br>Carl E. Fram, both of c/o Reid Valve Company Inc., 138 East Maple Ave., Monrovica, Calif. 91016 |
|---|---|---|
| [21] | Appl. No. | 687,937 |
| [22] | Filed | Sept. 21, 1967 |
| [45] | Patented | June 15, 1971<br>Continuation-in-part of application Ser. No. 412,191, Nov. 18, 1964, now abandoned. |

[54] MANUALLY OPERABLE ELASTIC SPRING AND VALVE MEMBER
2 Claims, 10 Drawing Figs.

[52] U.S. Cl. .................................................. 251/321,
251/335 A, 137/DIG. 4
[51] Int. Cl. ........................................................ F16k 7/00
[50] Field of Search .......................................... 251/331,
320, 321, 335.1, 335, DIG. 3

[56] References Cited
UNITED STATES PATENTS

| 787,591 | 4/1905 | Sonnenfield | 251/320 X |
| 957,347 | 5/1910 | Kennedy | 251/321 |
| 1,365,369 | 1/1921 | Boyce | 251/320 |
| 2,009,920 | 7/1935 | Grewe | 251/320 |
| 2,195,554 | 4/1940 | Beardsley | 251/321 X |
| 2,566,860 | 9/1951 | Segal | 251/321 X |
| 2,644,664 | 7/1953 | Hansen | 251/335.1 X |

FOREIGN PATENTS

| 1,185 | 1854 | Great Britain | 251/335 |
| 2,049 | 1860 | Great Britain | 251/331 |
| 40,079 | 1887 | Germany | 251/331 |

*Primary Examiner*—Arnold Rosenthal
*Attorney*—Lyon and Lyon

ABSTRACT: A valve structure in which a manually operable elastic member serves both as a valve-closing element and a spring element to maintain itself closed, this member having two flanged portions interconnected by a cylindrical portion, such flanged portions being in engagement with two internally shouldered portions of a valve casing and with such cylindrical portion being in a cylindrical casing portion which is in communication with inlet fluid pressure such that equal and opposite forces are developed on the flanged portions by said inlet fluid pressure.

OTTO S. REID
CARL E. FRAHM
INVENTORS.

BY Lyon & Lyon

ATTORNEYS

OTTO S. REID
CARL E. FRAHM
INVENTORS.

BY Lyon & Lyon
ATTORNEYS

MANUALLY OPERABLE ELASTIC SPRING AND VALVE MEMBER

The present application is a continuation-in-part of our copending application Ser. No. 412,191 filed Nov. 18, 1964, now abandoned.

The present invention relates to valve constructions particularly useful for dispensing fluids from a container.

A feature of the present invention involves the use of an elastic element of, for example, rubber which serves the dual purpose of a stopper and spring, the element being of such shape and so tensioned and cooperating with other elements of the valve to perform these dual functions.

An object of the present invention is to provide a valve structure having the feature indicated above.

Another object of the present invention is to provide a relatively simple and inexpensive valve construction.

Another object of the present invention is to provide improved dispenser means which is readily attached to containers and which incorporates means for facilitating dispensing operations.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGS. 1 and 2, respectively, are plan and front views of a valve construction embodying features of the present invention.

Figure 6:
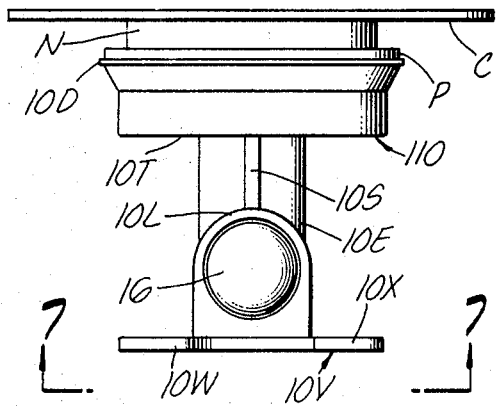
Figure 7:
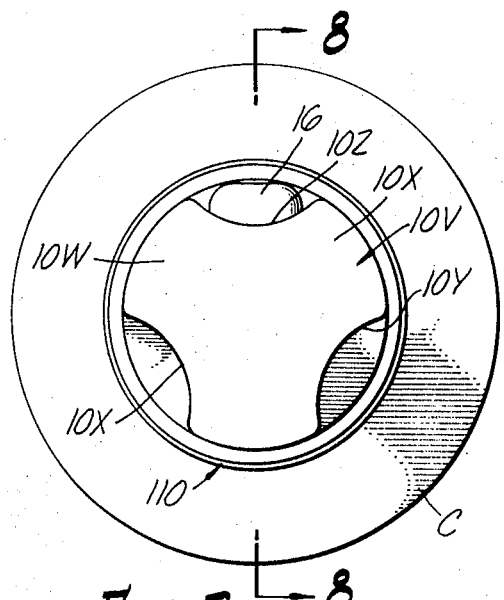
Figure 8:
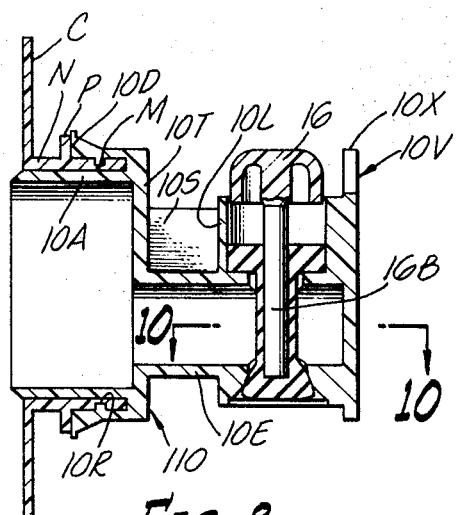
Figure 9:
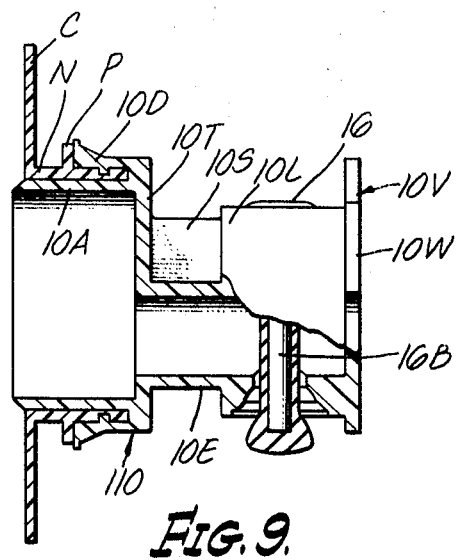
Figure 10:
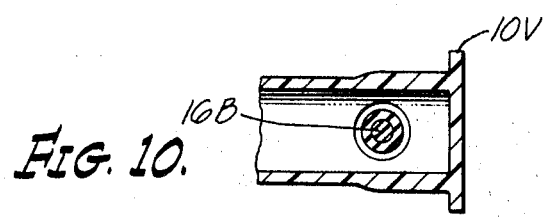

FIG. 6—10 related to a modification, FIG. 6 being a top plan view of a valve attached to a container, FIG. 7 being a view in front elevation as indicated by the lines 7–7 in FIG. 6, FIG. 8 being a sectional view indicated being the line 8–8 in FIG. 7, FIG. 9 being a view like FIG. 8 but with the valve shown in its actuated open condition, and FIG. 10 is a view taken as indicated by lines 10–10 in FIG. 8.

The valve construction includes a casing or housing element 10 of, for example, a plastic material which is formed at one of its ends with two concentric flange portions, i.e. an inner large flanged portion 10A axially aligned with the flow passage 10B and defining the valve inlet 10C, and a smaller outer flanged portion 10D. These flanged portions 10A, 10D cooperate with an apertured wall portion of a fluid container 12 from which fluids are dispensed to maintain the valve structure on the container. For this purpose, the inner flanged portion 10A extends within the container 12, the inner edge of the outer flanged portion 10D abuts the outer wall surface of the container and such container may be provided with an annular lip portion which is sealingly fitted within the annular space defined by the radially spaced flanged portions 10A, 10D.

Figure 1:
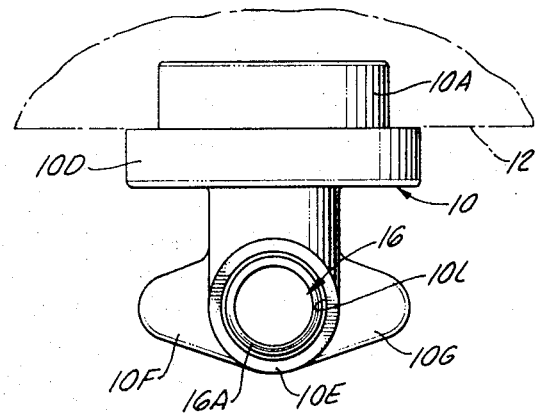
Figure 2:
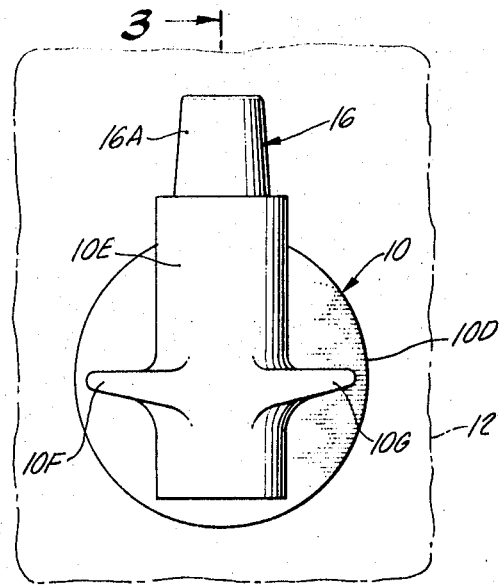

The casing 10 is also formed with a hollow cylindrical portion 10E having two external ear or finger grip portions 10F, 10G (FIG. 1) extending therefrom and also with an upper internal shouldered portion 10H and a lower concave portion 10J between which there is an internal cylindrical portion 10K in communication with the flow passage 10B.

A combination stopper and spring element 14 of elastic material, such as, for example, rubber, is mounted within the cylindrical portion 10E with an upper flanged portion 14A thereof engaging the shouldered portion 10H and with a lower convex bulbous portion 14B thereof engaging the concave casing portion 10J serving as a valve seat. The elastic element 14 when so mounted is under tension, and the tensile forces present therein serve to normally maintain the bulbous portion 14B against its seat 10J and the flanged portion 14A against the shouldered portion 10H to thereby normally sealingly maintain the valve 10J, 14B closed.

This elastic element 14 is formed with a blind cylindrical opening 14C terminating in a generally round opening 14D which is generally within the confines of the lower bulbous portion 14B. An actuator 16 of, for example, plastic material is formed with an upper tapered cylindrical portion 16A and a rod portion 16B, the rod portion 16B terminating in a ball portion 16C which is elastically maintained in the opening 14D, and the portion 16A being slidably received in the upper cylindrical casing portion 10L. That cylindrical portion 14F of element 14 which interconnects the flanged portion 14A with the bulbous portion 14B is of smaller diameter than the cylindrical casing opening 10K, and thus the fluid pressure from container 12 is applied to both the flanged portion 14A and bulbous portion 14B and acts in a direction to open the valve, but the initial tensile forces in the rubber element 14 prevent the valve from opening under fluid pressure.

Figure 3:
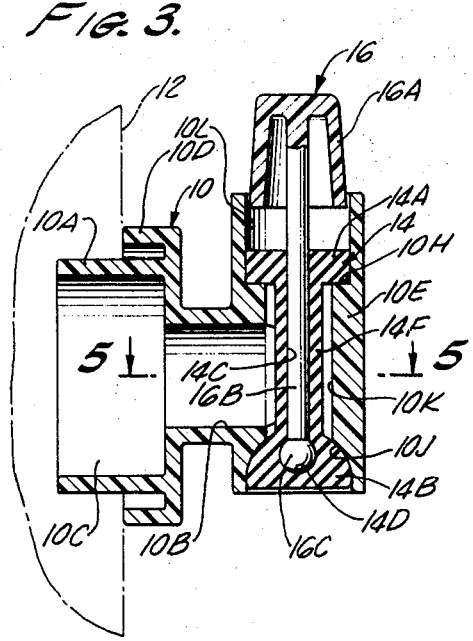
FIG. 3 is a view taken substantially as indicated by line 3–3 in FIG. 2, showing the valve in its normally closed condition.
Figure 4:
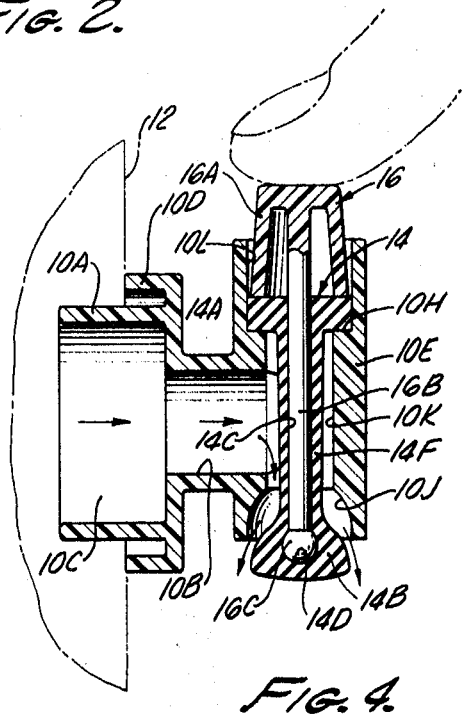
FIG. 4 is a view like FIG. 3, showing the valve construction 17 its actuated open position.
Figure 5:
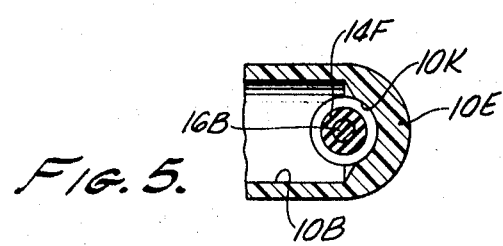
FIG. 5 is a view taken along line 5–5 of FIG. 3.

To open the valve, the button 16A is depressed manually as illustrated in FIG. 4 to cause the rubber element to be stretched and the bulbous portion 14B to move from its seat 10J. After release of such manual pressure, the valve returns to its closed position shown in FIG. 3 under the influence of the tensile forces present in the combined spring and stopper element 14.

In the modification shown in FIGS. 6—10 the casing or housing element 110 of plastic material is formed essentially as in the previous figures but in this instance the neck portion N of a plastic container C is formed with a flanged portion P and an annular grooved portion M within which a small annular flange 10R extends for securing the valve to the container with the flange P engaging the end of the outer flanged portion 10D. Also in this instance a stiffening rib 10S extends between the casing portion 10L and base portion 10T from which the spaced flanged portions 10A, 10D extend.

Also a generally flat plate portion 10V is now integrally formed with the cylindrical portion 10E, such plate portion 10V being conveniently notched to provide a pair of ear portions 10W, 10X for convenient carrying purposes and also for facilitating operation of the valve element 16.

In carrying the assembly of valve and container a person may use, for example, the index and middle finger of one of his hands to engage the underside of the ear portions 10W, 10X while pressing such fingers against the generally cylindrical body portion 10E. The container, such as for example a 1-gallon cylindrical container, is being carried in an upright condition with the cooperating grooved portion M cooperating with the internal flange portion 10R to maintain the liquid-filled container on the valve assembly which at that particular time serves as a convenient carrying means.

Also this notched plate portion 10V is useful in dispensing of fluids in that, for example, with the container supported such that liquid may flow from it by gravity, a person may use his index finger to press the actuator 16 down while at the same time applying an upward force with his thumb and middle finger which engage, at this time, the curved or notched edges 10X, 10Y of plate 10V, the other edge or surface 10Z being notched or curved as shown in FIG. 7 to steady the thumb.

Also instead of providing a bulbous rod end 16C as shown in FIG. 4 the same may be eliminated from the actuating rod 16B as seen in FIG. 8.

In all forms shown herein it will be seen that the intermediate cylindrical portion of the elastic member 14 is disposed in the cylindrical portion of the casing opening such that in the closed position of the valve member equal and opposite forces produced by fluid pressure in the inlet opening act on the flanged and bulbous portions of the elastic member 14.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a valve of the character described, a casing, said casing having an opening extending therethrough, said opening being defined in part by two spaced shouldered portions interconnected by a cylindrical portion with one of said shouldered portions serving as a valve seat, said casing having a second opening therein defining an inlet opening and being in communication with the first opening at a region between said spaced shouldered portions, an elastic valve member having two spaced flanged portions interconnected by a cylindrical portion with one of said flanged portions being in engagement with said one shouldered portion and with the other flanged portion being in engagement with the other shouldered portion of said casing and maintaining said valve member in tension, said flanged portions having equal areas exposed to pressure in said inlet opening, and means for moving said one flanged portion from its engagement with said one shouldered portion, said casing between said spaced shouldered portion defining a leakproof chamber for confining fluids applied under pressure to said inlet opening, said valve member being under sufficient tension to maintain said spaced flanged portion against said spaced shouldered portions to maintain said chamber leakproof, said plate-shaped element being integrally formed with said casing cylindrical portion with the plane of said plate-shaped element being generally parallel with the axis of said casing cylindrical portion, said platelike element having three notched portions one of which is adjacent said moving means to allow access to the same and to provide steadying of a person's finger operating said means, the other two of said notched portions being on opposite sides of said casing cylindrical portion.

2. A valve as set forth in claim 1 in which said casing has a pair of annular spaced flanged portions adapted to receive the neck of a container, one of said spaced flanged portions having annular means thereon for engagement with cooperating mating means on said neck.